United States Patent
Forshaw et al.

(10) Patent No.: US 11,280,190 B2
(45) Date of Patent: Mar. 22, 2022

(54) ESTIMATION OF A DOWNHOLE FLUID PROPERTY DISTRIBUTION

(71) Applicants: Matthew Forshaw, Celle (DE); Christian Linke, Celle (DE); Gerald Becker, Celle (DE)

(72) Inventors: Matthew Forshaw, Celle (DE); Christian Linke, Celle (DE); Gerald Becker, Celle (DE)

(73) Assignee: BAKER HUGHES OILFIELD OPERATIONS LLC, Houston, TX (US)

( * ) Notice: Subject to any disclaimer, the term of this patent is extended or adjusted under 35 U.S.C. 154(b) by 93 days.

(21) Appl. No.: 16/668,767

(22) Filed: Oct. 30, 2019

(65) Prior Publication Data

US 2021/0131281 A1   May 6, 2021

(51) Int. Cl.
*E21B 49/08* (2006.01)
*G01V 99/00* (2009.01)
(Continued)

(52) U.S. Cl.
CPC ............ *E21B 49/087* (2013.01); *E21B 44/00* (2013.01); *E21B 47/06* (2013.01); *G01V 99/005* (2013.01);
(Continued)

(58) Field of Classification Search
CPC ........ E21B 44/00; E21B 47/06; E21B 47/087; E21B 47/0875; E21B 2200/20
See application file for complete search history.

(56) References Cited

U.S. PATENT DOCUMENTS

| | | |
|---|---|---|
| 5,006,044 A | 4/1991 | Walker, Sr. et al. |
| 6,609,067 B2 | 8/2003 | Tare et al. |
| | (Continued) | |

FOREIGN PATENT DOCUMENTS

| | | |
|---|---|---|
| WO | 2011146923 A2 | 11/2011 |
| WO | 2017200548 A1 | 11/2017 |

OTHER PUBLICATIONS

Onyeji et al.; "Effective Real-Time Pore Pressure Monitoring Using Well Events: Case Study of Deepwater West Africa Nigeria". 2017. Retrieved from: https://www.onepetro.org/conference-paper/SPE-189128-MS.
(Continued)

*Primary Examiner* — Tara Schimpf
(74) *Attorney, Agent, or Firm* — Cantor Colburn LLP

(57) ABSTRACT

A method of estimating downhole fluid properties includes deploying a borehole string in a borehole in a resource bearing formation, simulating a downhole fluid property distribution along a length of the borehole string using a mathematical hydraulics model, the fluid property distribution related to downhole fluid pressure, measuring a downhole fluid property related to downhole fluid pressure at a selected location along the length of the borehole string to generate a measured fluid property value, and comparing the measured fluid property value to a simulated downhole fluid property at the selected location. The method also includes calculating a correction value based on a difference between the measured fluid property value and the simulated fluid property value at the selected location, correcting an entirety of the fluid property distribution along the length based on the correction value, and controlling a downhole operation based on the corrected fluid property distribution.

20 Claims, 3 Drawing Sheets

(51) Int. Cl.
*E21B 47/06* (2012.01)
*E21B 44/00* (2006.01)

(52) U.S. Cl.
CPC ....... *E21B 49/0875* (2020.05); *E21B 2200/20* (2020.05)

(56) References Cited

U.S. PATENT DOCUMENTS

| | | |
|---|---|---|
| 6,814,142 B2 | 11/2004 | Paulk et al. |
| 8,061,442 B2 | 11/2011 | Alberty |
| 8,240,398 B2 | 8/2012 | Lovorn et al. |
| 8,689,884 B2 | 4/2014 | Young et al. |
| 9,022,140 B2 | 5/2015 | Marx et al. |
| 9,255,473 B2 | 2/2016 | Burress et al. |
| 9,279,318 B2 | 3/2016 | Hay et al. |
| 9,804,288 B2 | 10/2017 | Estes et al. |
| 9,988,866 B2 | 6/2018 | Cotten et al. |
| 10,280,722 B2 | 5/2019 | Bello et al. |
| 2002/0112888 A1 | 8/2002 | Leuchtenberg et al. |
| 2011/0203845 A1 | 8/2011 | Jamison et al. |
| 2014/0012506 A1* | 1/2014 | Adsit ............... E21B 44/00 702/6 |
| 2015/0330218 A1 | 11/2015 | Pop et al. |
| 2016/0245048 A1* | 8/2016 | Jamison ............ E21B 44/04 |
| 2016/0273331 A1* | 9/2016 | Davis ............... E21B 21/08 |
| 2017/0122092 A1* | 5/2017 | Harmer ............ E21B 44/00 |
| 2018/0202285 A1* | 7/2018 | Williams .......... E21B 21/08 |
| 2018/0371873 A1 | 12/2018 | Bhatnagar et al. |
| 2019/0179873 A1 | 6/2019 | Schirrmann et al. |

OTHER PUBLICATIONS

Notification of Transmittal of the International Search Report and the Written Opinion of the International Searching Authority, or the Declaration; PCT/US2020/058139; dated Feb. 10, 2021; 8 pages.

* cited by examiner

ESTIMATION OF A DOWNHOLE FLUID PROPERTY DISTRIBUTION

BACKGROUND

Exploration and production of hydrocarbons require a number of diverse activities to be performed in a borehole penetrating a resource bearing formation. Such activities include drilling, performing downhole measurements, casing perforation, hydraulic fracturing, formation evaluation, and pressure pumping. Some activities, such as drilling and production, involve controlling the pressure and flow rate of fluid circulated through a borehole and/or entering a borehole from a formation.

SUMMARY

An embodiment of a method of estimating downhole fluid properties includes deploying a borehole string in a borehole in a resource bearing formation, simulating a downhole fluid property distribution along a length of the borehole string using a mathematical hydraulics model, the fluid property distribution related to downhole fluid pressure, measuring a downhole fluid property related to downhole fluid pressure at a selected location along the length of the borehole string to generate a measured fluid property value, and comparing the measured fluid property value to a simulated downhole fluid property at the selected location. The method also includes calculating a correction value based on a difference between the measured fluid property value and the simulated fluid property value at the selected location, correcting an entirety of the fluid property distribution along the length based on the correction value, and controlling an operational parameter of a downhole operation based on the corrected fluid property distribution.

An embodiment of a system for estimating downhole fluid properties includes a simulation engine configured to simulate a downhole fluid property distribution along a length of a borehole string using a mathematical hydraulics model, the fluid property distribution related to downhole fluid pressure, and a processing device configured to acquire a measured fluid property value related to downhole fluid pressure at one or more selected locations along the length of the borehole string. The processing device configured to compare the measured fluid property value to a simulated fluid property value at the selected location, calculate a correction value based on a difference between the measured fluid property value and the simulated fluid property value at the selected location, correct an entirety of the fluid property distribution along the length based on the correction value, and control an operational parameter of a downhole operation based on the corrected fluid property distribution.

BRIEF DESCRIPTION OF THE DRAWINGS

The following descriptions should not be considered limiting in any way. With reference to the accompanying drawings, like elements are numbered alike.

DETAILED DESCRIPTION

Figure 1:
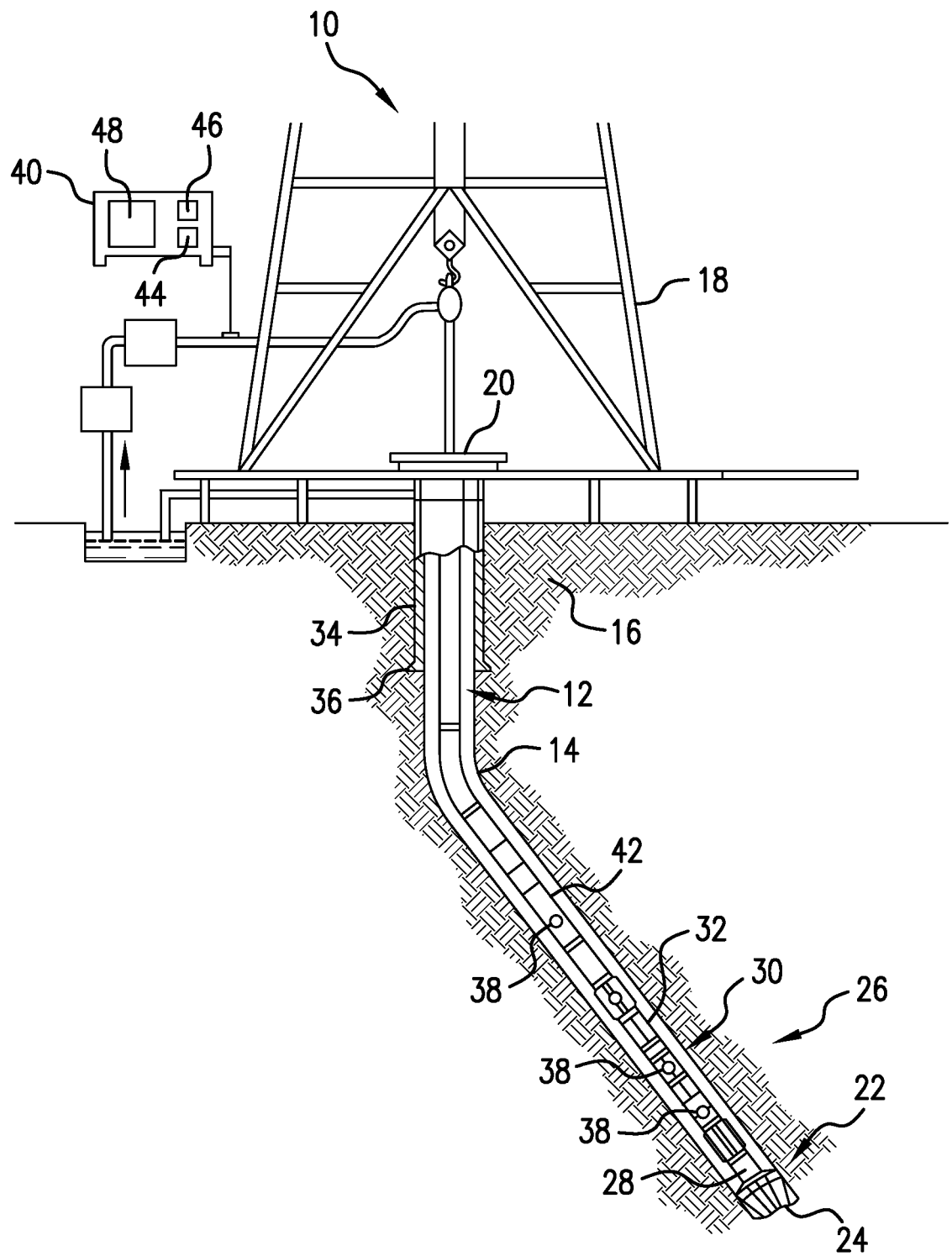
FIG. 1 is a cross-sectional view of an embodiment of a drilling and/or geosteering system.

Systems and methods for estimating and monitoring downhole fluid properties are described herein. An embodiment of a method includes simulating one or more fluid properties using a mathematical model of downhole fluid flow, such as a hydraulics model. The simulation produces a fluid property distribution that includes an array of fluid property values, such as pressure, flow rate, fluid composition and/or density. The array is produced to represent fluid properties along a selected length of a borehole, such as a length of an open hole section of a borehole.

The method also includes measuring a fluid property at a selected location or subset of the selected length, and comparing the measured fluid property to a fluid property value from the array (a simulated fluid property). For example, a hydraulics model is generated or updated based on inputs such as geometrical properties (e.g., tool or component diameter), borehole properties (e.g., size and trajectory), operational parameters (e.g., pressure and flow rate) and rheological properties. Simulation using the model results in a fluid property distribution, e.g., a fluid pressure array. A direct measurement of fluid pressure (e.g., a measured pressure value) at a selected location (e.g., depth) is compared to a simulated fluid pressure value for the selected location, and a correction value is calculated based on the comparison. The correction value may be a difference or delta between the measured pressure and the simulated pressure.

The method further includes correcting the fluid property distribution based on the correction value. In one embodiment, the correction value is applied uniformly to the distribution, i.e., each simulated value or data point in the distribution is shifted or otherwise corrected by the same correction value.

Embodiments described herein present a number of advantages and technical effects. The embodiments allow for a sufficiently accurate estimation, in real time, of an entire pressure regime along a borehole length, without the high processing requirements needed to individually calibrate all data points of a pressure regime, and without the additional cost and complexity of incorporating arrays of individual sensors. For example, the embodiments allow for a more accurate real time extrapolation to a drill bit for a more accurate estimation of circulating density or static density (e.g., mud weight) at the drill bit than had been previously achievable.

In addition, as discussed further below, the correction factor is not separated into circulating and static density components (e.g., hydrostatic and frictional component), and in some embodiments is applied uniformly for an entire borehole length (e.g., open hole section). As a result, the embodiments do not require assuming constant static and circulating density along a borehole length, or assuming a constant rate of frictional loss along the wellbore Referring to FIG. 1, a well drilling, logging and/or geosteering system 10 includes a borehole string 12 disposed in a wellbore or borehole 14 that penetrates at least one earth formation 16 during a drilling operation. As described herein, a "borehole" or "wellbore" refers to a single hole that makes up all or part of a drilled well. As described herein, "formations" refer to the various features and materials that may be encountered in a subsurface environment and surround the borehole.

In one embodiment, the borehole string 12 is configured as a drill string 12. However, the system 10 and the borehole string 12 are not so limited. For example, the borehole string 12 can be a production string (e.g., including coiled tubing or pipe) or other type of string that can be disposed in the borehole 14.

In one embodiment, the system 10 includes a derrick 18 that supports a rotary table 20 that is rotated at a desired rotational speed. The drill string 12 includes one or more drill pipe sections that extend from the rotary table 16 and are connected to a drilling assembly 22 that includes a drill bit 24. Drilling fluid or drilling mud is pumped through the drill string 12 and/or the borehole 14. The drilling assembly 22 and/or other components of the drill string 12 (or components connected to the drill string 12) may be configured as at least part of a bottomhole assembly (BHA) 26.

The drilling assembly 20 may be rotated from the surface as discussed above, using the rotary table 16 or a top drive, or may be rotated in another manner. For example, a drill motor or mud motor 28 can be coupled to the drilling assembly 22 to rotate the drilling assembly 22.

In one embodiment, the drilling assembly 22 includes a steering assembly 30 connected to the drill bit 24. The steering assembly 30 may be a bent sub steering assembly, a rotary steering assembly or other suitable device or system. The steering assembly 30 can be utilized in geosteering operations to steer the drill bit 24 and the string 12 through the formation 16.

The system 10 includes any number of downhole tools 32 for various processes including formation drilling, geosteering, and formation evaluation (FE) for measuring versus depth and/or time one or more physical quantities in or around a borehole. The tool 32 may be included in or embodied as a BHA, drill string component or other suitable carrier.

A section of the borehole 14 shown in FIG. 1 includes a casing 34 extending from the surface and terminating at a casing shoe 36. This section is referred to as a "cased section." Although one casing is shown, the cased section may include multiple lengths of casing. The section or length of the borehole 14 below the casing shoe 36 is referred to as an "open hole section."

In one embodiment, one or more downhole components, such as the drill string 12, the downhole tool 32, the drilling assembly 22 and the drill bit 24, include one or more sensors configured to measure various parameters of the formation and/or borehole. For example, one or more fluid flow sensors 38 are disposed at one or more locations on the borehole string 12 along a length of the borehole 14, e.g., the open hole section. Each fluid flow sensor 38 can measure one or more borehole fluid parameters (e.g., viscosity, density, rheology, pH level, and gas, oil and water contents) and/or fluid flow parameters (e.g., pressure, flow rate, etc.).

Various other sensors may be incorporated into the system 10. For example, the borehole string 12 (and/or other components, such as the casing 34) includes one or more sensors for formation evaluation measurements and/or other parameters of interest relating to the formation, borehole, geophysical characteristics, borehole fluids and boundary conditions. Such sensors may include formation evaluation sensors (e.g., resistivity, dielectric constant, water saturation, porosity, density and permeability), sensors for measuring borehole parameters (e.g., borehole size, and borehole roughness), and sensors for measuring geophysical parameters (e.g., acoustic velocity and acoustic travel time).

Generally during drilling, operators monitor fluid properties such as pressure, flow rate and/or density and control operational parameters to maintain borehole fluid pressures within desired boundary conditions. Such boundary conditions can include formation pore pressure and formation fracture pressure. Fluid properties are monitored and operational parameters adjusted as needed to maintain borehole fluid pressure between the pore pressure and the fracture pressure.

For example, an operator controls fluid density at the surface so as to prevent an overbalanced condition in the borehole 14 and to avoid flow in from the formation. The properties of the borehole fluid (such as density, viscosity) and the fluid flow rate largely determine the effectiveness of the fluid to carry cuttings to the surface. One downhole parameter that is desired to be monitored is the annulus pressure, which is related to the circulating pressure when borehole fluid is circulated through the borehole 14 and the hydrostatic pressure at the wellbore annulus. The hydrostatic pressure may be expressed as the equivalent static density ("ESD"). ESD is affected by and can vary as a function of pressure and temperature.

The circulating pressure may be expressed as the equivalent circulating density ("ECD") of the fluid. ECD is the sum of the hydrostatic pressure and the frictional pressure losses caused by the fluid circulating from the surface and down the bore of a drill string or other borehole string, exiting the borehole string (e.g., at a drill bit) and then circulating up the annulus of the open hole and the casing(s) on its way back to the surface. This causes an increase in the pressure profile along this path that is different from the pressure profile when the well is in a static condition (i.e., not circulating). ECD can be expressed as the sum of the ESD and pressure loss in the borehole annulus due to fluid flow. In order to control the annulus pressure, the ECD can be controlled, for example, by controlling the density of drilling fluid injected into the borehole 14 or by changing the surface flow rate.

The system 10 includes components and/or functionality for calculating and monitoring fluid properties during an operation. Estimation of fluid properties includes acquiring a fluid property distribution along a length of the borehole 14 using a mathematical hydraulics model. The fluid property distribution includes, for example, a curve and/or array of simulated fluid property values, such as pressure, flow rate or density. A "fluid property" refers to any property or parameter that can be used to monitor borehole fluid during a drilling operation or other operation that includes circulating, injecting or otherwise flowing fluid through a borehole and/or borehole string, and is not limited to the specific examples described herein.

At least one direct measurement of the fluid property (or property related to the simulated fluid property) is taken at a selected location within the length of the borehole for which simulation was performed. The direct measurement may be a single discrete measurement at a single location (e.g., depth). The direct measurement may also be a distributed measurement or series of discrete measurements corresponding to a subset of the length.

The direct measurement of the fluid property (also referred to as a measured fluid property value) is compared to a corresponding value of the fluid property from the fluid property distribution (also referred to as a simulated fluid property value), and a correction value is derived therefrom. For example, a discrete pressure measurement at a selected location in the open hole section of FIG. 1 is compared to a pressure value taken from a simulated or modeled fluid pressure distribution. The correction value, in one embodiment, is a difference between the measured fluid property value and the simulated fluid property value or based on the difference.

The system 10 then applies the correction value to an entirety of a selected length of the borehole 14 simulated using the model. In one embodiment, the correction value is applied uniformly along the entirety of the selected length. For example, the difference between a discrete pressure measurement at a selected location and a simulated pressure value at the selected location is applied to each point along a pressure curve or distribution.

In one embodiment, the system 10 includes a processing device configured to perform aspects of fluid property estimation as described herein. In one embodiment, as shown in FIG. 1, the processing device is part of a surface and/or downhole processing device that can perform simulations, acquire measurement data and/or correct fluid property distributions in real time.

For example, the borehole string 12, drilling assembly 22, the sensor(s) 38 and/or other downhole components are equipped with transmission equipment to communicate with a processor or processing device such as a surface processing unit 40 and/or a downhole processor 42.

The surface processing unit 40 (and/or the downhole processor 42) may be configured to perform functions such as controlling drilling and steering, controlling the flow rate and pressure of borehole fluid, transmitting and receiving data, processing measurement data, simulating fluid properties, calibrating or adjusting simulated fluid property distributions, and/or monitoring operations of the system 10. The surface processing unit 40, in one embodiment, includes an input/output (I/O) device 44, a processor 46, and a data storage device 48 (e.g., memory, computer-readable media, etc.) for storing data, models and/or computer programs or software that cause the processor to perform aspects of methods and processes described herein.

Figure 2:
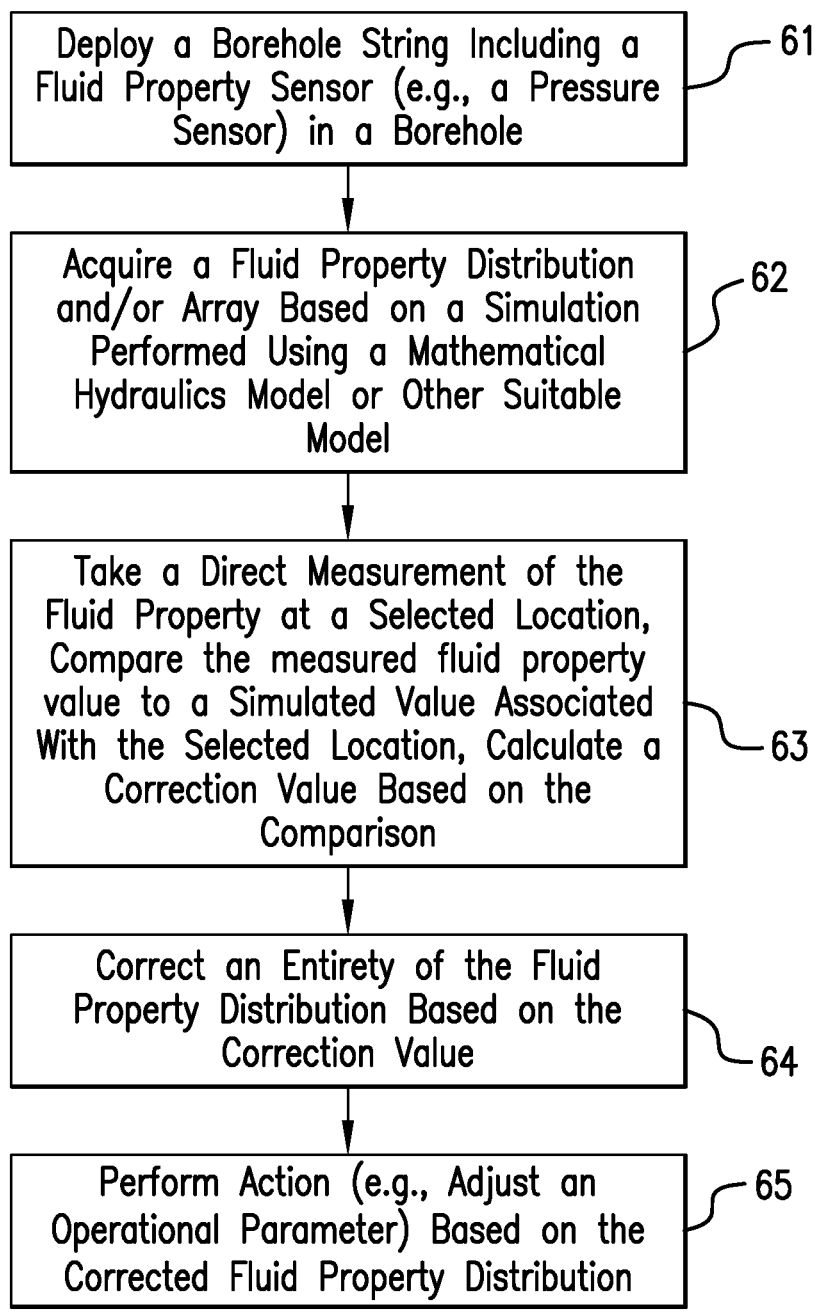
FIG. 2 is a flow chart depicting an embodiment of a method of estimating downhole fluid properties and generating a fluid property distribution.

FIG. 2 illustrates a method 60 of estimating fluid properties during a downhole operation. The method 60 includes one or more of stages 61-65 described herein, at least portions of which may be performed by a processor (e.g., the surface processing unit 40 and/or downhole processor 42). In one embodiment, the method includes the execution of all of stages 61-65 in the order described. However, certain stages 61-65 may be omitted, stages may be added, or the order of the stages changed.

The method 60 is discussed in relation to the system 10 of FIG. 1 and in conjunction with a drilling operation. It is noted that the method 60 is not so limited and can be used in conjunction with any suitable downhole or energy industry operation that includes flowing fluid through a borehole.

Figure 3:
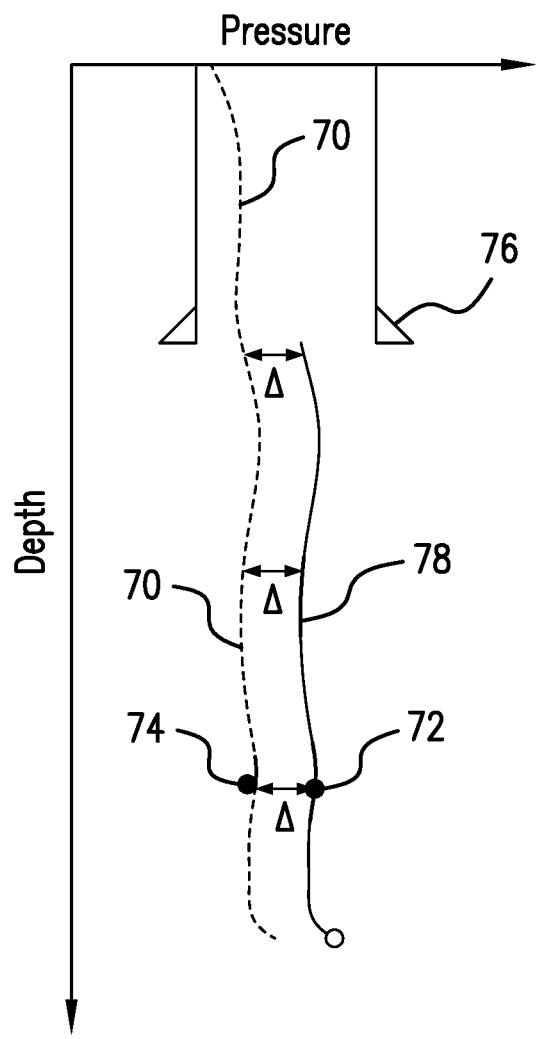
FIG. 3 depicts an example of a fluid property distribution and aspects of adjusting or calibrating the fluid property distribution according to the method of FIG. 2.

The method 60 is also discussed in conjunction with an example of a fluid property distribution shown in FIG. 3. FIG. 3 also shows aspects of calibration or adjustment of the fluid property distribution according to the method 60. The example of FIG. 3 is provided for illustrative purposes and is not intended to be limiting.

In the first stage 61, a borehole string (e.g., the borehole string 12) is deployed into a borehole during a downhole or energy industry operation. For example, the borehole string is configured as a drill string and is deployed as part of a drilling, directional drilling and/or measurement operation. The borehole string includes at least one fluid property sensor, such as a flow rate sensor, fluid density sensor, or pressure sensor, or combination sensors at a given location or depth. In the example of FIG. 3, a drill string is deployed with a pressure sensor.

In the second stage 62, a fluid property distribution is acquired based on a simulation performed using a mathematical hydraulics model or other suitable model. In one embodiment, the model is a hydraulics model that simulates a distribution of fluid properties such as flow rate, pressure and/or fluid density. The model is generated by inputting information including geometric properties (e.g., borehole and/or drill string geometry), operating properties (e.g., surface operational properties) and fluid properties. The model provides output information indicative of simulated fluid density and/or other properties as a distribution or curve.

In one embodiment, inputs to the model include a combination of a planned semi-static object and real-time parameters. Real-time parameters may be surface measured engineering values as well as fluid properties such as temperature and rheology.

The model output may be, for example, an equivalent density array for equivalent static density (ESD) and/or equivalent circulating density (ECD), and is returned from a simulation engine. The output may be an array or curve that represents a continuous or substantially continuous estimation of fluid properties along a length of the borehole.

For example, referring to FIG. 3, information including geometric properties (e.g., drill string diameter or diameters along the borehole), material properties (e.g., thermal properties, materials making up the borehole string and/or components thereof), current or planned operational parameters (e.g., selected or planned density of drilling mud, flow rate and/or pressure), and real time measurements are input to the model. The model output is shown as a pressure curve 70 that expresses downhole fluid pressure as a function of depth.

In the third stage 63, a direct fluid property measurement is performed at a selected location along the borehole. For example, a direct measurement of a fluid property (e.g., flow rate, pressure and/or density) is taken at a single depth or location (or a subset of the modeled length of the borehole) and a measured fluid property value is generated.

In the example of FIG. 3, a direct measurement of equivalent densities (e.g., equivalent mud weights) in the annulus at a selected depth downhole are measured by an MWD assembly and transmitted to the surface via various forms of telemetry, or via wired pipe. The density measurement may be used to generate a measured value 72 of pressure at the selected depth.

The direct measurement, which in the example of FIG. 3 represents a measured pressure value at a single point at a selected depth, is compared to a corresponding simulated value 74 at the selected depth from the pressure distribution 70.

A correction value is then calculated based on the comparison. For example, a difference between the measured pressure value 72 and the simulated pressure value 74 is calculated as a correction value Δ.

In the fourth stage 64, the entirety of the fluid property distribution (or a selected portion of the fluid property distribution) is corrected using the correction value. In one embodiment, the correction value is applied uniformly along the entire portion of the fluid property distribution, i.e., each data point in an array or curve is uniformly shifted, adjusted or changed by the same amount based on the correction value.

For example, referring again to FIG. 3, an open hole portion of the pressure distribution is selected by discarding portions of the pressure distribution 70 above a casing shoe 76. The correction value Δ is then used to correct the pressure distribution and generate a corrected pressure distribution 78 for the open hole section. It is applied uniformly across the entire array present in the open-hole section. As a result of the correction (e.g., shift), a new equivalent density can be calculated at a drill bit depth (bottomhole). The magnitude and polarity of the correction value Δ can be used as an indicator or diagnostic parameter for drilling problems such as poor hole cleaning, and also to provide judgement on the quality of pre-planning models.

As noted above, the calculation of the correction value does not include separation of frictional and hydrostatic components of the correction value, but instead can be considered an overall correction value. Thus, the correction value may be the result of contributions to the difference in hydrostatic pressure, frictional pressure losses or a combination of both.

As a result, the correction value can be derived without regard to the relative contributions of hydrostatic and frictional losses. This is advantageous in that it is not necessary to assume that the equivalent static density is constant. Such an assumption, which may be required if the contribution by frictional losses is desired to be quantified, can reduce the accuracy of simulated pressures and densities. This is due to the fact that ESD is not constant, especially in combination with cuttings and varying ROP and temperature in the borehole.

In the fifth stage 65, various actions can be performed based on the corrected fluid property distribution. Examples of actions include presenting information to an operator, performing a sensor calibration, adjusting the model based on the corrected distribution, performing measurement correction. Other actions may include adjusting operational parameters, such as fluid pressure and/or flow rate (e.g., to maintain fluid pressure within boundary conditions). Further actions can include planning operational parameters for subsequent operations. One or more of the actions may be executed in real-time, e.g., while the operation (e.g., drilling operation) is ongoing.

It is noted that one or more of the above stages may be performed in real time or near real time. For example, direct measurements taken downhole by the pressure sensor and/or other sensors, generation or updating of the model, and/or analysis of direct measurements and model adjustments can be performed in real time as an operation progresses and/or as measurement data is acquired. In addition, actions performed based on the corrected fluid property distribution may be performed in real time. For example, operational parameters such as the density, fluid composition, flow rate and/or pressure of drilling mud (or other fluid) injected into the borehole can be adjusted in real time to maintain downhole fluid pressure within boundary conditions (e.g., pore pressure and fracture pressure).

Set forth below are some embodiments of the foregoing disclosure:

Embodiment 1: A method of estimating downhole fluid properties, comprising: deploying a borehole string in a borehole in a resource bearing formation; simulating a downhole fluid property distribution along a length of the borehole string using a mathematical hydraulics model, the fluid property distribution related to downhole fluid pressure; measuring a downhole fluid property related to downhole fluid pressure at a selected location along the length of the borehole string to generate a measured fluid property value, and comparing the measured fluid property value to a simulated downhole fluid property at the selected location; calculating a correction value based on a difference between the measured fluid property value and the simulated fluid property value at the selected location; correcting an entirety of the fluid property distribution along the length based on the correction value; and controlling an operational parameter of a downhole operation based on the corrected fluid property distribution.

Embodiment 2: The method as in any prior embodiment, wherein the correction value is a single value that is applied uniformly along the entirety of the fluid property distribution.

Embodiment 3: The method as in any prior embodiment, wherein the fluid property distribution is a fluid pressure distribution, and the measured fluid property value is a measured fluid pressure value.

Embodiment 4: The method as in any prior embodiment, wherein the measured fluid pressure value is a single measurement value associated with the selected location, and the correcting includes adjusting the fluid pressure distribution at each location simulated using the hydraulics model.

Embodiment 5: The method as in any prior embodiment, wherein the fluid pressure distribution is represented by a pressure curve of simulated downhole fluid pressures for the length.

Embodiment 6: The method as in any prior embodiment, wherein the correcting includes shifting an entirety of the pressure curve by an amount corresponding to the correction value.

Embodiment 7: The method as in any prior embodiment, wherein the correction value is a single value that is applied uniformly along an entirety of the length of the open hole section.

Embodiment 8: The method as in any prior embodiment, wherein the fluid property distribution includes an array of equivalent circulating density (ECD) values or equivalent static density (ESD) values, and the measured fluid property value is an equivalent mud weight value derived from a measurement of fluid pressure at the selected location.

Embodiment 9: The method as in any prior embodiment, wherein the correcting includes adjusting an entirety of the array based on a difference between an ECD value of the array and the equivalent mud weight value at the selected location, or based on a difference between an ESD value of the array and the equivalent mud weight value at the selected location.

Embodiment 10: The method as in any prior embodiment, wherein the correction value is a single value that accounts for individual contributions of hydrostatic pressure and frictional pressure losses without differentiating between the individual contributions.

Embodiment 11: A system for estimating downhole fluid properties, comprising: a simulation engine configured to simulate a downhole fluid property distribution along a length of a borehole string using a mathematical hydraulics model, the fluid property distribution related to downhole fluid pressure; and a processing device configured to acquire a measured fluid property value related to downhole fluid pressure at one or more selected locations along the length of the borehole string, the processing device configured to perform: comparing the measured fluid property value to a simulated fluid property value at the selected location; calculating a correction value based on a difference between the measured fluid property value and the simulated fluid property value at the selected location; correcting an entirety of the fluid property distribution along the length based on the correction value; and controlling an operational parameter of a downhole operation based on the corrected fluid property distribution.

Embodiment 12: The system as in any prior embodiment, wherein the correction value is a single value that is applied uniformly along the entirety of the fluid property distribution.

Embodiment 13: The system as in any prior embodiment, wherein the fluid property distribution is a fluid pressure distribution, and the measured fluid property value is a measured fluid pressure value.

Embodiment 14: The system as in any prior embodiment, wherein the measured fluid pressure value is a single measurement value associated with the selected location, and the correcting includes adjusting the fluid pressure distribution at each location simulated using the hydraulics model.

Embodiment 15: The system as in any prior embodiment, wherein the fluid pressure distribution is represented by a pressure curve of simulated downhole fluid pressures for the length.

Embodiment 16: The system as in any prior embodiment, wherein the correcting includes shifting an entirety of the pressure curve by an amount corresponding to the correction value Embodiment 17: The system as in any prior embodiment, wherein the correction value is a single value that is applied uniformly along an entirety of the length of the open hole section.

Embodiment 18: The system as in any prior embodiment, wherein the fluid property distribution includes an array of equivalent circulating density (ECD) values or equivalent static density (ESD) values, and the measured fluid property value is an equivalent mud weight value derived from a measurement of fluid pressure at the selected location.

Embodiment 19: The system as in any prior embodiment, wherein the correcting includes adjusting an entirety of the array based on a difference between an ECD value of the array and the equivalent mud weight value at the selected location, or based on a difference between an ESD value of the array and the equivalent mud weight value at the selected location.

Embodiment 20: The system as in any prior embodiment, wherein the correction value is a single value that accounts for individual contributions of hydrostatic pressure and frictional pressure losses without differentiating between the individual contributions.

As used herein generation of data in "real time" is taken to mean generation of data at a rate that is useful or adequate for making decisions during or concurrent with processes such as production, experimentation, verification, and other types of surveys or uses as may be opted for by a user. As a non-limiting example, real time measurements and calculations may provide users with information necessary to make desired adjustments during the drilling process. In one embodiment, adjustments are enabled on a continuous basis (at the rate of drilling), while in another embodiment, adjustments may require periodic cessation of drilling for assessment of data. Accordingly, it should be recognized that "real time" is to be taken in context, and does not necessarily indicate the instantaneous determination of data, or make any other suggestions about the temporal frequency of data collection and determination.

In support of the teachings herein, various analyses and/or analytical components may be used, including digital and/or analog systems. The system may have components such as a processor, storage media, memory, input, output, communications link (wired, wireless, pulsed mud, optical or other), user interfaces, software programs, signal processors (digital or analog) and other such components (such as resistors, capacitors, inductors and others) to provide for operation and analyses of the apparatus and methods disclosed herein in any of several manners well-appreciated in the art. It is considered that these teachings may be, but need not be, implemented in conjunction with a set of computer executable instructions stored on a computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

While the invention has been described with reference to exemplary embodiments, it will be understood by those skilled in the art that various changes may be made and equivalents may be substituted for elements thereof without departing from the scope of the invention. In addition, many modifications will be appreciated by those skilled in the art to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A method of estimating downhole fluid properties, comprising:
deploying a borehole string in a borehole in a resource bearing formation;
simulating a downhole fluid property distribution along a length of the borehole string using a mathematical hydraulics model, the simulated downhole fluid property distribution related to downhole fluid pressure and including a plurality of simulated downhole fluid property values corresponding to the length of the borehole string;
measuring a downhole fluid property related to the downhole fluid pressure at a selected location along the length of the borehole string to generate a measured fluid property value, and comparing the measured fluid property value to at least one simulated downhole fluid property value of the plurality of simulated downhole fluid property values of the simulated downhole fluid property distribution at the selected location;
calculating a correction value based on a difference between the measured fluid property value and the at least one simulated downhole fluid property value at the selected location;
correcting the simulated downhole fluid property distribution along the length of the borehole string based on the correction value; and
controlling an operational parameter of a downhole operation based on the corrected simulated downhole fluid property distribution.

2. The method of claim 1, wherein the correction value is a single value that is applied uniformly along the plurality of simulated downhole fluid property values.

3. The method of claim 1, wherein the simulated downhole fluid property distribution is a simulated fluid pressure distribution, and the measured fluid property value is a measured fluid pressure value.

4. The method of claim 3, wherein the measured fluid pressure value is a single measurement value associated with the selected location, and the correcting includes adjusting the simulated fluid pressure distribution at each location simulated along the length of the borehole string using the mathematical hydraulics model.

5. The method of claim 3, wherein the simulated fluid pressure distribution is represented by a pressure curve of simulated downhole fluid pressures for the length of the borehole string.

6. The method of claim 5, wherein the correcting includes shifting the pressure curve by an amount corresponding to the correction value.

7. The method of claim 6, wherein the correction value is a single value that is applied uniformly to the pressure curve along the length of the borehole string.

8. The method of claim 1, wherein the simulated downhole fluid property distribution includes an array of equivalent circulating density (ECD) values or equivalent static density (ESD) values, and the measured fluid property value is an equivalent mud weight value derived from a measurement of the downhole fluid pressure at the selected location.

9. The method of claim 8, wherein the correcting includes adjusting the array based on a difference between an ECD value of the array and the equivalent mud weight value at the selected location, or based on a difference between an ESD value of the array and the equivalent mud weight value at the selected location.

10. The method of claim 1, wherein the correction value is a single value that accounts for individual contributions of hydrostatic pressure and frictional pressure losses without differentiating between the individual contributions.

11. A system for estimating downhole fluid properties, comprising:
a simulation engine configured to simulate a downhole fluid property distribution along a length of a borehole string using a mathematical hydraulics model, the simulated downhole fluid property distribution related to downhole fluid pressure and including a plurality of simulated downhole fluid property values corresponding to the length of the borehole string; and
a processing device configured to acquire a measured fluid property value related to the downhole fluid pressure at a selected locations along the length of the borehole string, the processing device configured to perform:
comparing the measured fluid property value to at least one simulated downhole fluid property value of the plurality of simulated downhole fluid property values of the simulated downhole fluid property distribution at the selected location;
calculating a correction value based on a difference between the measured fluid property value and the at least one simulated downhole fluid property value at the selected location;
correcting the simulated downhole fluid property distribution along the length of the borehole string based on the correction value; and
controlling an operational parameter of a downhole operation based on the corrected simulated downhole fluid property distribution.

12. The system of claim 11, wherein the correction value is a single value that is applied uniformly along the plurality of simulated downhole fluid property values.

13. The system of claim 11, wherein the simulated downhole fluid property distribution is a simulated fluid pressure distribution, and the measured fluid property value is a measured fluid pressure value.

14. The system of claim 13, wherein the measured fluid pressure value is a single measurement value associated with the selected location, and the correcting includes adjusting the simulated fluid pressure distribution at each location simulated along the length of the borehole string using the mathemathical hydraulics model.

15. The system of claim 13, wherein the simulated fluid pressure distribution is represented by a pressure curve of simulated downhole fluid pressures for the length of the borehole string.

16. The system of claim 15, wherein the correcting includes shifting the pressure curve by an amount corresponding to the correction value.

17. The system of claim 16, wherein the correction value is a single value that is applied uniformly to the pressure curve along the length of the borehole string.

18. The system of claim 11, wherein the simulated downhole fluid property distribution includes an array of equivalent circulating density (ECD) values or equivalent static density (ESD) values, and the measured fluid property value is an equivalent mud weight value derived from a measurement of the downhole fluid pressure at the selected location.

19. The system of claim 18, wherein the correcting includes adjusting the array based on a difference between an ECD value of the array and the equivalent mud weight value at the selected location, or based on a difference between an ESD value of the array and the equivalent mud weight value at the selected location.

20. The system of claim 11, wherein the correction value is a single value that accounts for individual contributions of hydrostatic pressure and frictional pressure losses without differentiating between the individual contributions.

\* \* \* \* \*